United States Patent Office 2,765,322
Patented Oct. 2, 1956

2,765,322

PREPARATION OF BIS(4-GLYCIDYLOXYPHENYL)-SULFONE

Ellington M. Beavers, Philadelphia, Pa., assignor to Rohm & Haas Company, Philadelphia, Pa., a corporation of Delaware No Drawing. Application March 3, 1953,
Serial No. 340,143

3 Claims. (Cl. 260—348)

This invention relates to bis(4-glycidyloxyphenyl)sulfone and to its preparation.

The product of this invention which has the formula

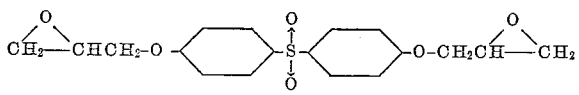

is a high-melting, crystalline solid which is readily polymerized and is also very reactive. While the compound reacts readily through its epoxy groups with such other groups as hydroxyl, carboxyl and amino groups the remainder of the molecule is extraordinarily stable. Due to its reactivity with such materials as alkyd resins, phenolic resins and urea resins and presumably due to its high melting point it is particularly valuable for the production of strong adhesives, hard and mar-proof surface coatings, and rugged cast objects.

The synthesis of bis(4-glycidyloxyphenyl)sulfone is best effected by reacting under the influence of heat two molar equivalents of epichlorohydrin with one molar equivalent of 4,4'-dihydroxydiphenyl sulfone in the presence of a basic compound, such as potassium hydroxide or sodium hydroxide. The course of the reaction can be understood from this representation:

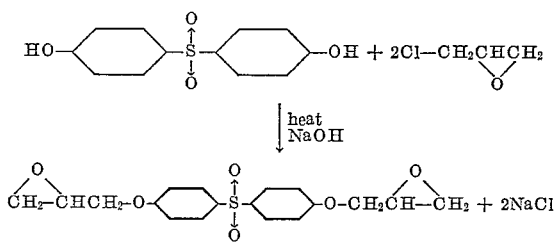

While the reactants combine in the ratio of two moles of epichlorohydrin to one of the sulfone, as indicated above, it is much preferred to employ an excess, over this ratio, of the epichlorohydrin. When such an excess—preferably of the order of two to five times the stoichiometrical amount—of the epichlorohydrin is used the reaction proceeds much more smoothly and gives rise to smaller quantities of polymeric products. In addition the epichlorohydrin serves as a solvent, facilitates stirring, and assures intimate contact of the reactants.

Additional solvents can also be present during the reaction such as acetone, methyl ethyl ketone, although it is preferred to conduct the reaction in the absence of extraneous solvents.

The reaction is best conducted in an oxygen-free atmosphere and it is recommended that it be carried out under a blanket of an inert gas such as nitrogen or carbon dioxide.

Best results are obtained when the basic compound is added gradually at such a rate that the hydrogen chloride is neutralized as it is formed and the reaction mixture remains neutral to phenolphthalein. Alkaline conditions are particularly conducive to the formation of polymers. Besides sodium hydroxide, the following materials are suitable as basic agents: potassium hydroxide, calcium hydroxide, barium hydroxide, and the carbonates and bicarbonates of the alkali and alkaline earth metals, preferably those of sodium and potassium. It is much preferred to employ a water-soluble basic compound so that it can be added as an aqueous solution and can be washed from the final product with water, although the basic material can be added as a solid or slurry if desired.

It is recommended that the reaction be carried out at a temperature from about 80° C. to about 120° C. Higher and lower temperatures than these have been used but below 80° C. the reaction is unnecessarily slow and above 120° C. the quantity of by-products increases rapidly. Actually, the optimal range, which is therefore preferred, is from about 100° C. to about 110° C.

Since the product of this invention is a high-melting solid (M. P. 162°–163° C.) it is easily purified by crystallization from organic solvents such as benzene or acetone.

The following example illustrates the preferred method of preparing the product of this invention.

*Example*

Into a reactor equipped with thermometer, mechanical stirrer and reflux condenser was charged 100 grams (0.4 mole) of 4,4'-dihydroxydiphenyl sulfone and 148 grams (1.6 moles) of epichlorohydrin. The stirred mixture was heated under an atmosphere of nitrogen to the refluxing temperature during which time the sulfone dissolved completely in the epichlorohydrin. The mixture was maintained at the refluxing temperature (105°–110° C.) for 7 hours while 32 grams (0.8 mole) of sodium hydroxide was added in the form of a 30% aqueous solution. This addition was made at such a rate that the reaction mixture was always neutral to phenolphthalein indicator. As the reaction mixture cooled to room temperature an amorphous solid separated. The solid was triturated in cold benzene and filtered. It was then recrystallized from benzene. (Acetone has also been used satisfactorily.) Approximately a fifty percent yield was obtained of white, crystalline bis(4-glycidyloxyphenyl)-sulfone which melted at 162°–163° C. Its composition was confirmed by analysis for carbon, hydrogen and sulfur and by determination of the amount of oxirane oxygen.

The product of this invention polymerizes in the presence of catalysts to infusible and insoluble three-dimensional polymers. Suitable catalysts include acidic Friedel-Crafts catalysts such as boron trifluoride, aluminum chloride and titanium tetrachloride, as well as basic catalysts such as primary, secondary and tertiary amines.

It should be noted, as indicated above, that during the preparation of the bis(4-glycidyloxyphenyl)sulfone some resinous products of higher molecular weight are also formed, especially when the ratio of epichlorohydrin to the 4,4'-dihydroxydiphenyl sulfone is close to the stoichiometrical amount. These materials which range in appearance from soft amorphous solids to hard brittle resins are mixtures of compounds which have this general formula:

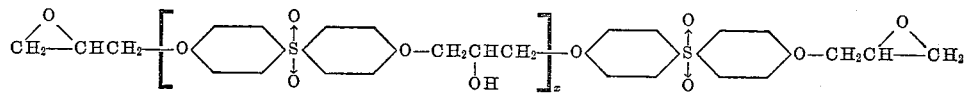

where X is a whole number such as 1, 2, 3, et cetera. Compounds have been prepared whose analysis and measurements show that the compounds all have the above formula in which the value of X ranges from 1 up to 12. Of course when X in the above formula is zero the formula is that of bis(4-glycidyloxyphenyl)sulfone per se. Regardless of the value of X, whether it be zero or a higher value, it is to be noted that all of the compounds do contain terminal epoxy groups and as a result of this configuration all of the compounds have the ability to react with other compounds, including polymeric materials, which contain amino, carboxyl or hydroxyl groups to form a wide variety of useful resinous products. Therefore, although it is ordinarily desirable to produce and isolate bis(4-glycidyloxyphenyl)sulfone per se, there are many applications—particularly in the preparation of resins—where a mixture of bis(4-glycidyloxyphenyl)sulfone and the other glycidyloxyphenyl sulfones discussed above can be used to real advantage.

I claim:

1. Bis(4-glycidyloxyphenyl)sulfone having the formula

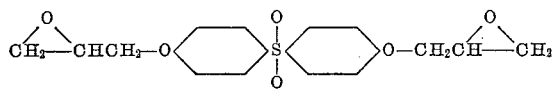

and being a crystalline solid having a melting point of 162°–163° C.

2. A process for preparing bis(4-glycidyloxyphenyl)sulfone which comprises heating a mixture of 4,4'-dihydroxyphenylsulfone and epichlorhydrin at a temperature from 80° to 120° C. from the group consisting of inorganic bases and basic inorganic salts and adding to the heated mixture a basic compound, capable of neutralizing hydrogen chloride, at such a rate that the reaction mixture remains neutral to phenolphthalein indicator, said epichlorhydrin being present in an amount equal to at least four moles per mole of said sulfone, and thereafter isolating said bis(4-glycidyloxyphenyl)sulfone from said reaction mixture.

3. A process for preparing bis(4-glycidyloxyphenyl)sulfone which comprises heating a mixture of 4,4'-dihydroxyphenylsulfone and epichlorhydrin at a temperature from 100° to 110° C. and adding sodium hydroxide to the heated mixture at such a rate that the reaction mixture remains neutral to phenolphthalein indicator, said epichlorhydrin being present in an amount equal to at least four moles per mole of said sulfone and thereafter isolating said bis(4-glycidyloxyphenyl)sulfone from said reaction mixture.

References Cited in the file of this patent

UNITED STATES PATENTS

| 2,444,333 | Castan | June 29, 1948 |

FOREIGN PATENTS

| 133,819 | Australia | Aug. 10, 1949 |
| 137,156 | Sweden | Sept. 1952 |